United States Patent
Rouhollahzadeh et al.

[11] Patent Number: 6,064,885
[45] Date of Patent: May 16, 2000

[54] TREATMENT OF POSITIONING DATA DURING A POSITIONING HANDOVER

[75] Inventors: Bagher Rouhollahzadeh; Shahrokh Amirijoo; Gunnar Borg, all of Dallas, Tex.

[73] Assignee: Ericsson, Inc., Research Triangle Park, N.C.

[21] Appl. No.: 08/944,355

[22] Filed: Oct. 6, 1997

[51] Int. Cl.⁷ .............................. H04B 1/06; H04Q 7/00
[52] U.S. Cl. ...................... 455/439; 455/442; 455/456; 370/331; 342/450
[58] Field of Search ...................... 455/439, 442, 455/446, 436, 456, 440, 525; 370/331; 342/456, 457; 340/825.36, 825.49, 988, 989

[56] References Cited

U.S. PATENT DOCUMENTS

| | | | |
|---|---|---|---|
| 4,472,802 | 9/1984 | Pin et al. .................................. | 370/104 |
| 4,799,062 | 1/1989 | Sanderford, Jr. et al. ............... | 342/450 |
| 5,386,456 | 1/1995 | Schatz et al. .............................. | 379/60 |
| 5,432,843 | 7/1995 | Bonta ......................................... | 379/60 |
| 5,471,644 | 11/1995 | Schatz et al. ........................... | 455/33.2 |
| 5,517,674 | 5/1996 | Rune ...................................... | 455/33.2 |
| 5,548,808 | 8/1996 | Bruckert et al. ........................ | 455/33.2 |
| 5,613,205 | 3/1997 | Dufour .................................... | 455/33.2 |
| 5,657,487 | 8/1999 | Coner ....................................... | 455/456 |

OTHER PUBLICATIONS

EPO Search Report dated Jan. 2, 1999.

*Primary Examiner*—Wellington Chin
*Assistant Examiner*—Sheila B. Smith
*Attorney, Agent, or Firm*—Jenkens & Gilchrist, P.C.

[57] ABSTRACT

A telecommunications system and method for handling positioning data acquired by a target Base Station Controller (BSC) during a positioning handover, in order to accurately determine the geographical position of a Mobile Station (MS) by a Positioning Center (PC). In one preferred embodiment of the present invention, the target BSC can collect the necessary data for positioning and transmit the data to a serving Mobile Switching Center (MSC). Alternatively, the target BSC can transmit the collected data to an originating BSC, which in turn packages all of the data acquired by both the originating BSC and the target BSC and transmits this data to the MSC. In the case where a target MSC is also involved, the positioning data can be collected by the target BSC and transmitted to the target MSC for forwarding either to the originating MSC or the Positioning Center itself.

29 Claims, 5 Drawing Sheets

TREATMENT OF POSITIONING DATA DURING A POSITIONING HANDOVER

BACKGROUND OF THE PRESENT INVENTION

1. Field of the Invention

The present invention relates generally to telecommunications systems and methods for determining the geographical position of a mobile terminal within a cellular network, and specifically to handling positioning data acquired by a target Base Transceiver Station (BTS), which is not controlled by the same node as the originating BTS, during a positioning handover.

2. Background and Objects of the Present Invention

Cellular telecommunications is one of the fastest growing and most demanding telecommunications applications ever. Today it represents a large and continuously increasing percentage of all new telephone subscriptions around the world. a standardization group, European Telecommunications Standards Institute (ETSI), was established in 1982 to formulate the specifications for the Global System for Mobile Communication (GSM) digital mobile cellular radio systems.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for detection of home zone calls, which are charged at a lower rate, for detection of hot spots for micro cells, or for the subscriber to determine, for example, the nearest gas station, restaurant, or hospital.

Currently, as can be seen in FIG. 2B of the drawings, upon a network positioning request, the Base Station System (BSS) (220 and 240) serving the MS 200 generates positioning data, which is delivered to the Mobile Switching Center (MSC) 260. This positioning data is then forwarded to a Positioning Center (PC) 270 for calculation of the geographical location of the MS 200. The location of the MS 200 can then be sent to the application 280 within the network that requested the positioning.

In order to accurately determine the location of the MS 200, positioning data from three separate Base Transceiver Stations (210, 220, and 230) is required. This positioning data for GSM systems includes a Timing Advance (TA) value, which corresponds to the amount of time in advance that the MS 200 must send a message in order for the BTS 220 to receive it in the time slot allocated to that MS 200. It should ben understood, however, that any estimate of distance can be used, instead of the TA value of GSM systems. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can unambiguously be determined (with certain accuracy) by the Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. Positioning handover is identical to an ordinary asynchronous handover. The target BTS, for example, BTS 210, distinguishes the Positioning Handover from an ordinary handover by a new ACTIVATION TYPE in the CHANNEL ACTIVATION message. However, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

If both neighboring (target) BTSs (210 and 230) are within an area allocated to one serving Base Station Controller (BSC) 240, then the TA values are collected using intra-BSC positioning handover methods, in which the BSC 240 sends the collected data (TA values) to a serving MSC 260. However, when at least one of the target BTSs, for example, BTS 230 is controlled by a different BSC, e.g., BSC 250 or a different MSC (not shown), an inter-BSC, or inter-MSC respectfully, positioning handover is required. Handling of the positioning data from the BTS's (210, 220, and 230) is critical in this situation to accurately determine the location of the MS.

It is therefore one object of the invention to accurately determine the position of a mobile terminal during an inter-BSC or an inter-MSC positioning handover.

It is a further object of the invention to provide a method for the collection of the positioning data and the routing of this data to the Positioning Center during and inter-BSC or an inter-MSC positioning handover.

SUMMARY OF THE INVENTION

The present invention is directed to telecommunications systems and methods for handling the positioning data acquired by a target BSC during a positioning handover. In one preferred embodiment of the present invention, the target BSC can collect the necessary data for positioning and transmit it to the MSC. By sending the positioning data directly to the MSC, the amount of signaling is reduced. Alternatively, the target BSC can transmit the collected data to the originating BSC via the MSC, which in turn packages all of the data acquired within both the originating BSC and the target BSC(s) and transmits this data back to the MSC. Advantageously, this alternative does not require any extra administration in the MSC. In the case where a target MSC is also involved, the positioning data can be collected by the target BSC and transmitted to the target MSC for forwarding either to the originating MSC or the Positioning Center itself.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
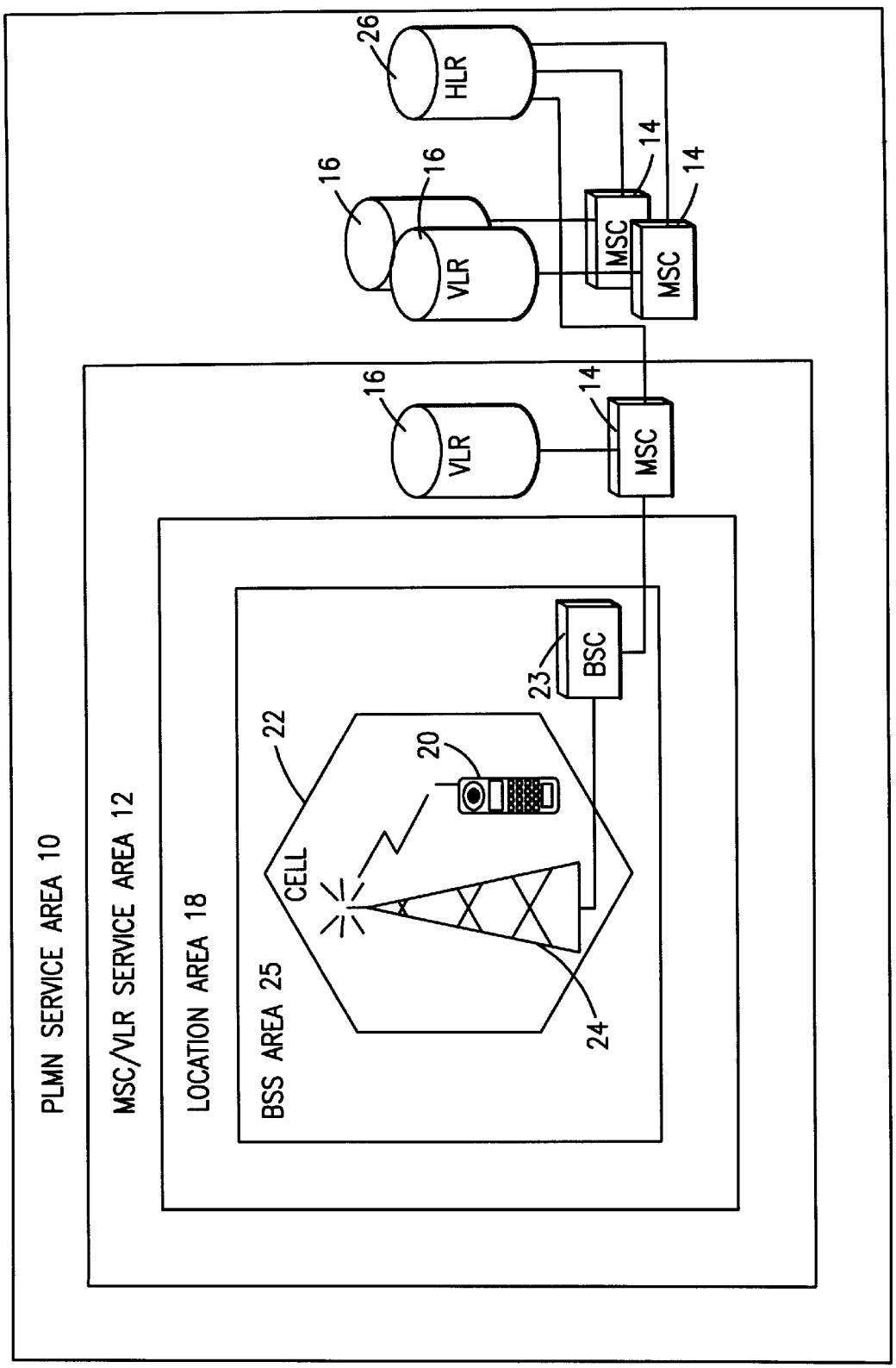
FIG. 1 is a block diagram of a conventional terrestrially-based wireless telecommunications system.
Figure 2A:
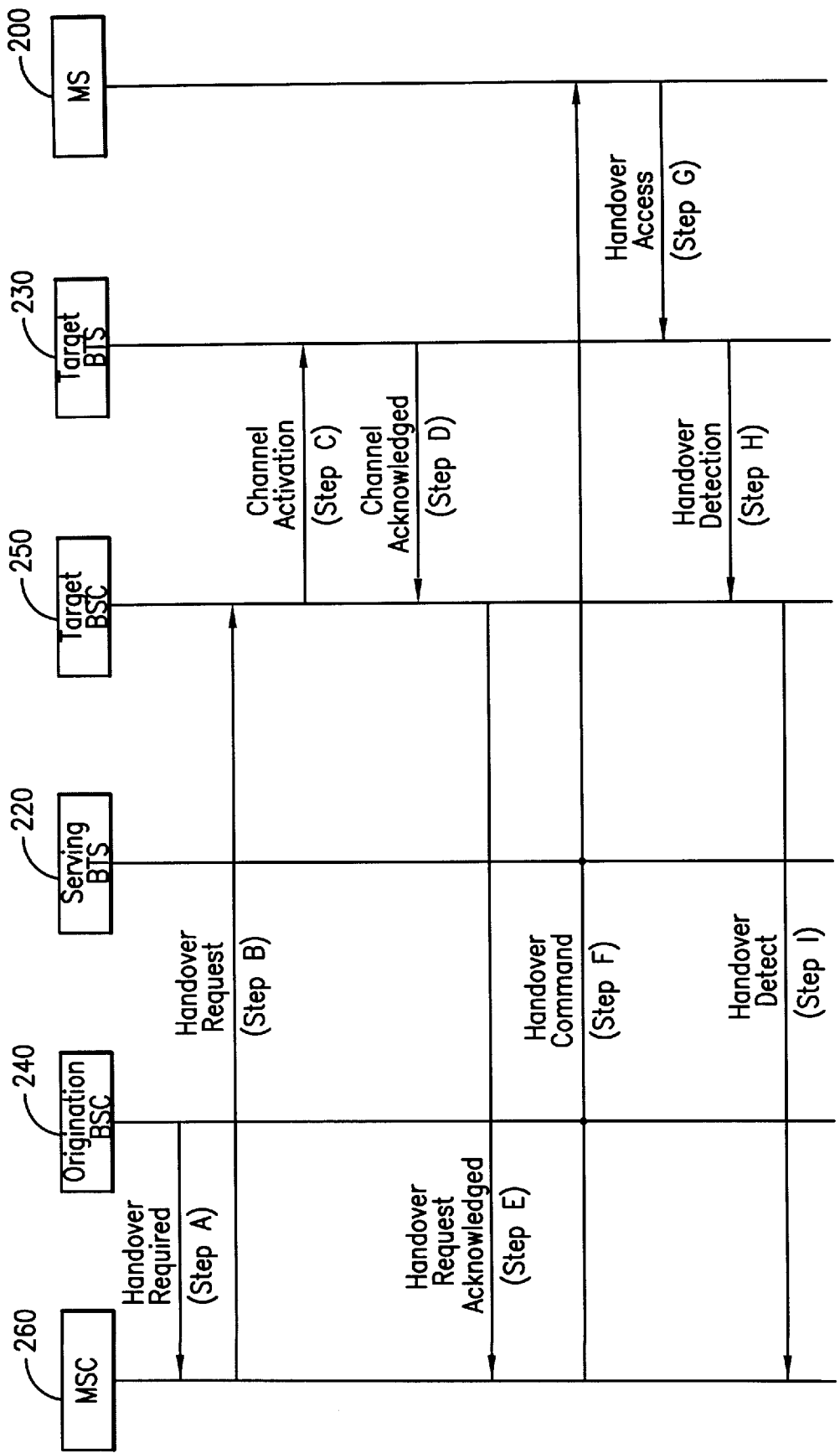
FIGS. 2A and 2B illustrate one sample embodiment of the present invention in which positioning data acquired by a target Base Station Controller (BSC) is transmitted to an originating Mobile Switching Center (MSC)
Figure 2B:
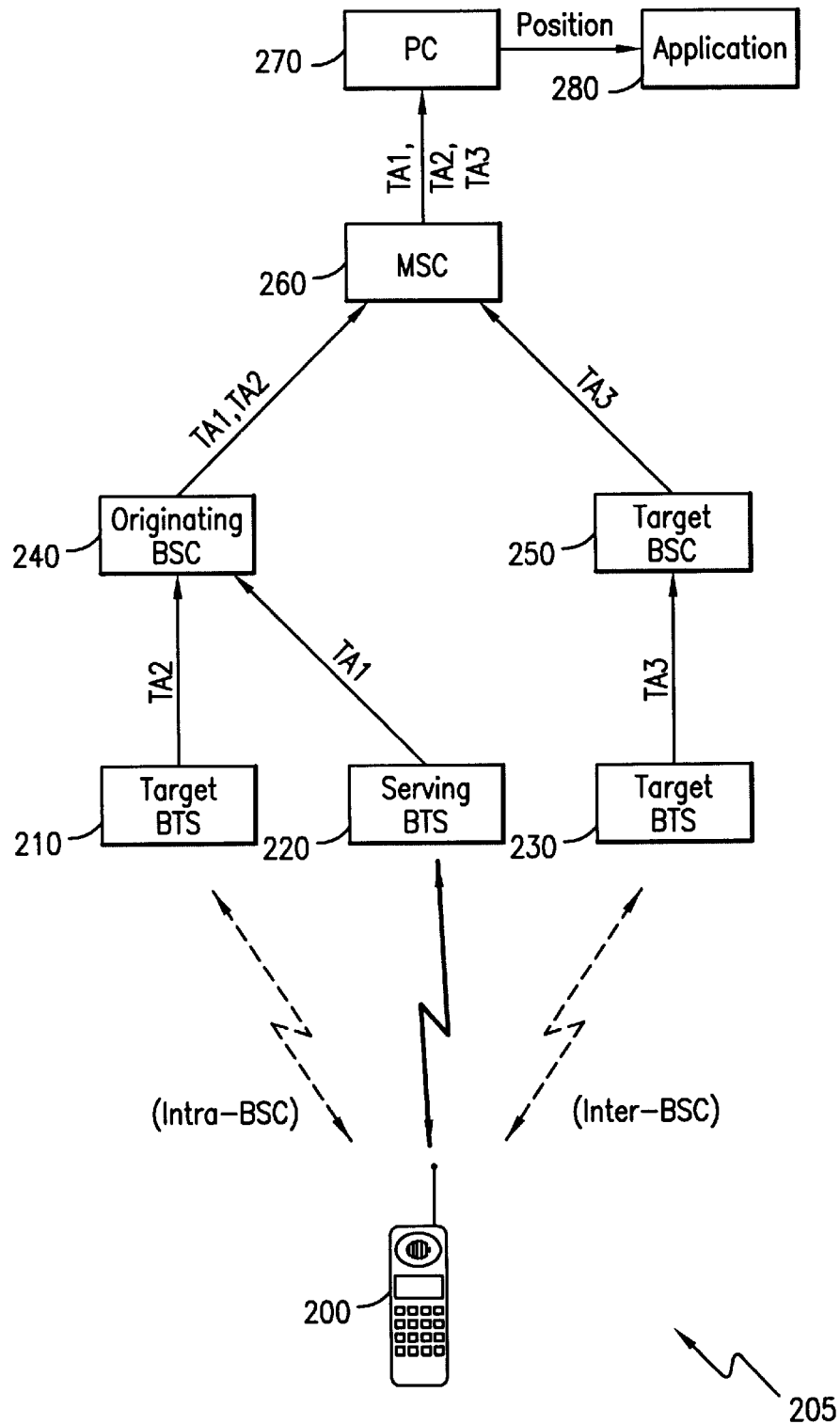

When the geographical position of a Mobile Station (MS) 200 is desired, as shown in FIG. 2B, a positioning handover between an originating Base Transceiver Station 220 and two neighboring (target) Base Transceiver Stations (BTSs) (210 and 230) must occur. At the boundary between the areas covered by each BTS (210, 220, and 230), Timing Advance (TA) values are obtained from the neighboring BTSs (210 and 230). For a GSM system, if both neighboring BTSs (210 and 230) are within an area allocated to one serving Base Station Controller (BSC) 240, then the TA values are collected using intra-BSC positioning handover methods, in which the BSC 240 sends the collected data (TA values) to a serving Mobile Switching Center (MSC) 260.

However, at a boundary between two Base Station Controllers (BSCs) (240 and 250), the neighboring BTSs (210 and 230) may each belong to a separate BSC (240 and 250 respectfully). In this case, in order to acquire a TA value from the target BTS 230, which is controlled by a different BSC 250, an inter-BSC positioning handover is required. The handling of the positioning data obtained from the neighboring BTSs (210 and 230) in this situation is critical to accurately determine the position of the MS 200.

With reference now to FIGS. 2A and 2B of the drawings, one preferred embodiment of the present invention for handling positioning data acquired by a target BSC 250 during a positioning handover is described. FIG. 2A illustrates the data flow between the different nodes, while FIG. 2B is a block diagram showing the interrelationship of the various nodes.

Initially, after a positioning request is received by the Mobile Switching Center 260 serving the Location Area 205 that the MS 200 is in from a Positioning Center 270, which could be located within the MSC 260, or could be a separate node in communication with the MSC 260, the MSC 260 sends this positioning request to the originating (serving) Base Station Controller (BSC) 240. The originating BSC 240 then determines which Base Transceiver Stations (BTSs) (210, 220, and 230) can be used for acquiring a Timing Advance (TA) value to accurately determine the location of the MS 200. First, a TA value is obtained from the serving BTS 220 (TA1), and any other BTSs 210 within the area allocated to the BSC 240 (TA2) by performing a positioning handover, as described hereinbefore.

However, if the originating BSC 240 determines that at least one of the target BTSs 230 is controlled by a different BSC (target BSC) 250, the originating BSC 240 sends a HANDOVER REQUIRED message to the MSC 260, which includes a new cause value indicating positioning (POS) (step A). This cause value is in turn transmitted in a HANDOVER REQUEST message to the target BSC 250 (step B) Thereafter, the target BSC 250 sends an ACTIVATION TYPE indicating POS in a CHANNEL ACTIVATION message to the target BTS 230 (step C), which informs the target BTS 230 that a positioning handover needs to be performed. The target BTS 230 then acknowledges the CHANNEL ACTIVATION message to the target BSC 250 (step D), which then acknowledges the positioning handover request to the MSC 260 (step E).

Thereafter, the MSC 260 sends a command to the MS 200 via the serving BSC 240 and BTS 230 (step F) to transmit a HANDOVER ACCESS message to the target BTS 230 (step G). During the time that the MS 200 is waiting for a response from the target BTS 230, e.g., around 320 milliseconds, the target BTS 230 measures the Timing Advance value (access delay) (TA3), using access bursts sent by the MS 200, and forwards this positioning data to the target BSC 250 (step H). The TA value measured by the target BTS 230 (TA3) is then transmitted by the target BSC 250 to the MSC 260 in, e.g., a HANDOVER DETECT message (step I), or a new message, which advantageously reduces the amount of signaling. Both the cause value and the TA value are included in this message.

Finally, the TA value acquired from the target BTS 230 (TA3), together with other TA values (TA1 and TA2) sent by the originating BSC 240 and any other target BSC (not shown) (if for example target BTS 210 is controlled by a separate BSC) are forwarded to the Positioning Center (PC) 270 from the MSC 260, where the location of the MS 200 is determined using the triangulation algorithm. The PC 270 then presents the geographical position of the MS 200 to the requesting application 280 for further processing. Advantageously, by sending the positioning data directly to the MSC, the amount of signaling is reduced.

Figure 3A:
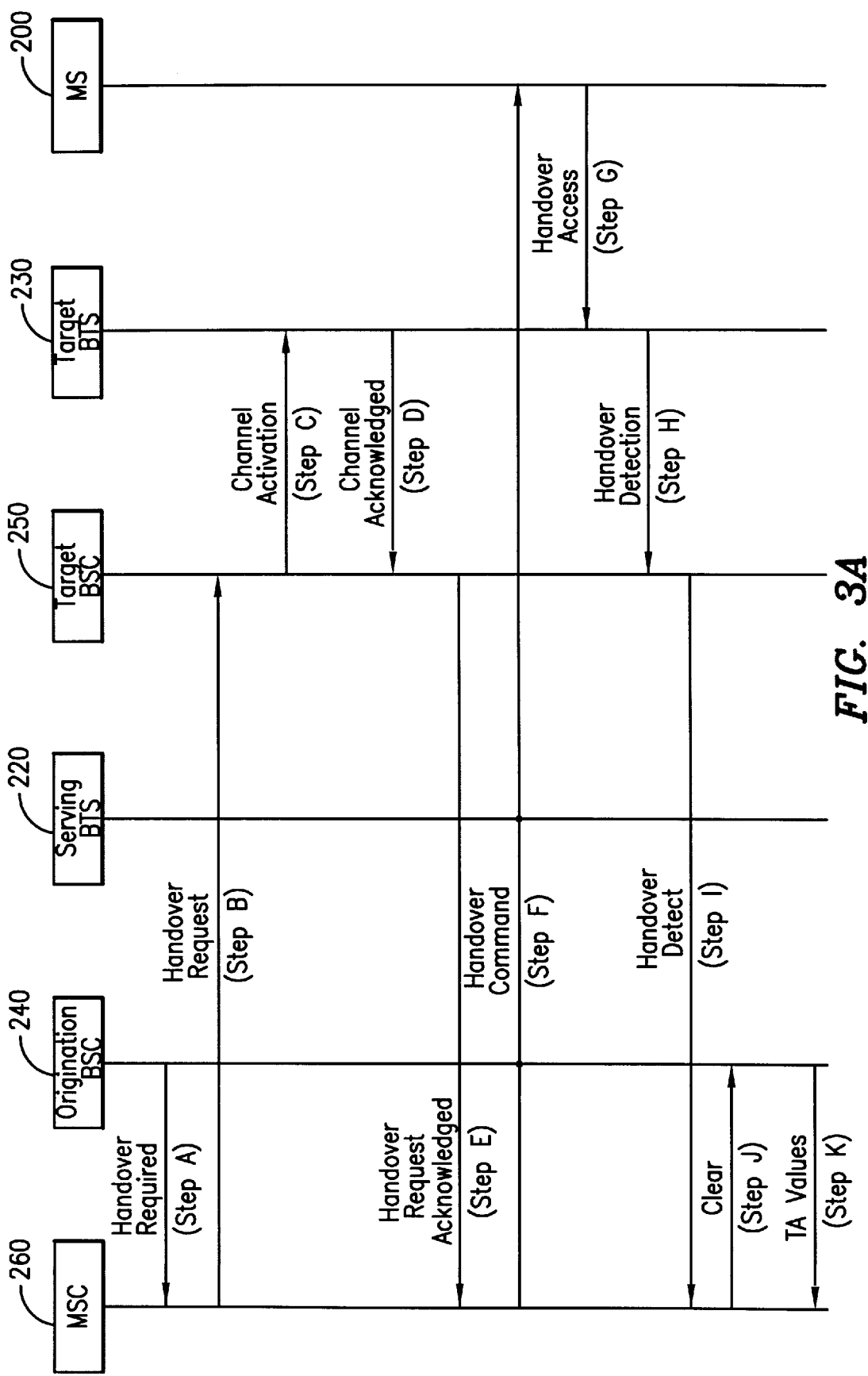
FIGS. 3A and 3B illustrate another sample embodiment of the present invention in which positioning data acquired by the target BSC is transmitted to an originating BSC, which then forwards it to the originating MSC.
Figure 3B:
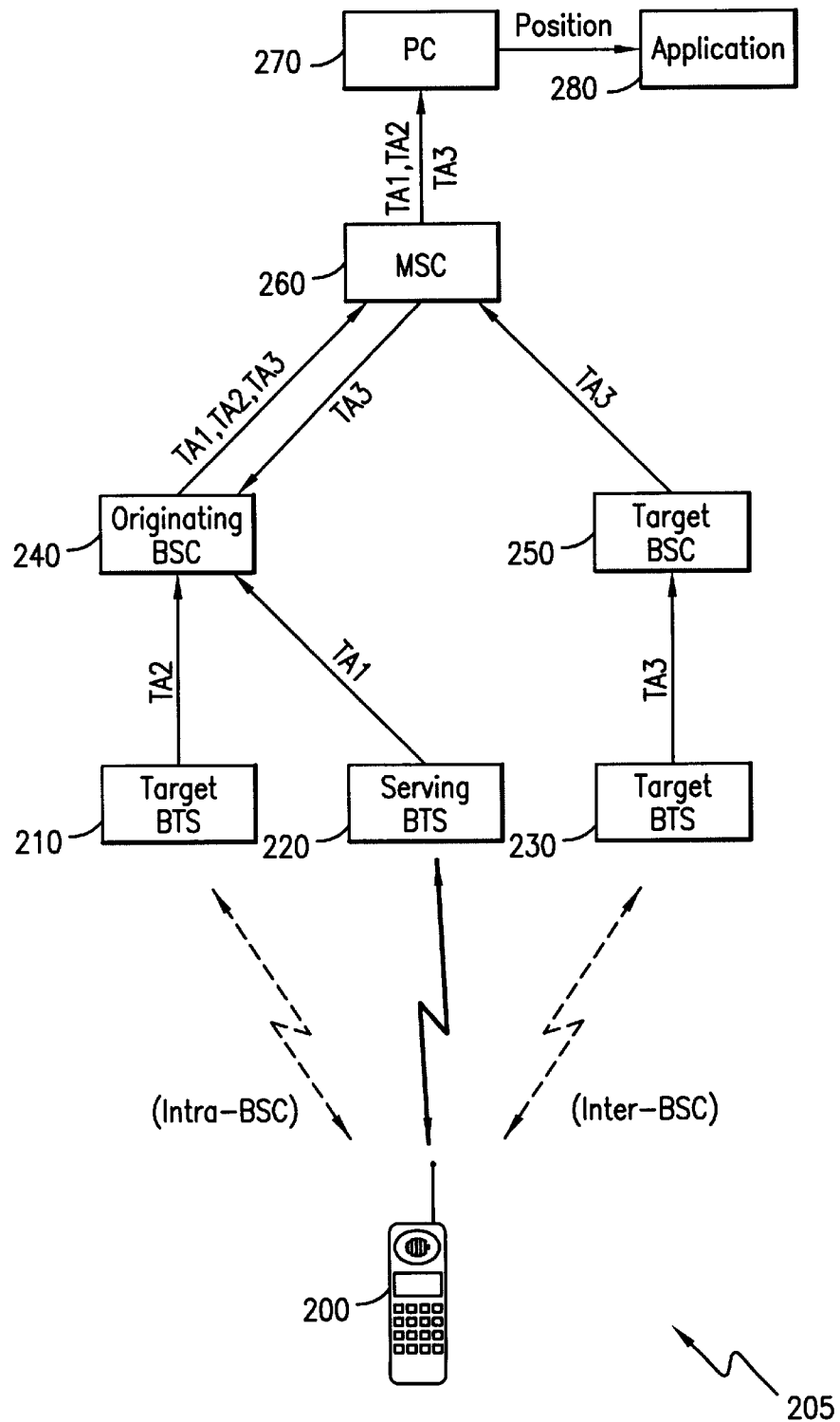

In an alternative embodiment, as described in FIGS. 3A and 3B, after the TA values have been determined by the target BSC 250 (step H) (TA3), the target BSC 250 can transmit this positioning data via a modified HANDOVER DETECT message to the MSC 260 (step I). As stated hereinbefore, the modified HANDOVER DETECT message, or other new message, includes two new elements: the TA value(s) and the cause value indicating positioning (POS). The MSC 260 can then transmit this data to the originating BSC 240, using, e.g., a CLEAR MESSAGE (step J). Thereafter, the originating BSC 240 can package all of the collected data, e.g., TA values from the target BSC 250 (TA3), the originating BSC 240 (TA1 and TA2), and any other surrounding BSC's (not shown), if necessary, to obtain the TA values from the three separate BTS's (210, 220, and 230), and transmit this data to the MSC 260 (step K). Advantageously, this alternative does not require extra administration in the MSC 260.

The same procedure described in the above alternatives can be applied for handling of positioning data at inter-MSC positioning handover. For example, if one target BTS 230 is within a location area (not shown) controlled by a different BSC 250 and a different MSC (not shown) than the originating MSC 260, the TA value obtained by that target BTS 230 can be transmitted to the target MSC (not shown) via the target BSC 250 to be forwarded by the target MSC (not shown) to either the originating MSC 260 or directly to the PC 270 itself.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the aforedescribed handling of positioning data can be implemented in any cellular system, and should not be limited to GSM systems. In other cellular systems, the Base Station Controller function can be implemented within the Mobile Switching Center itself.

What is claimed is:

1. A telecommunications system for determining the location of a given one of a plurality of mobile terminals from a plurality of positioning data, said telecommunications system comprising:
    a serving base transceiver station in wireless communication with said given mobile terminal, said serving base transceiver station determining a first of said positioning data;
    a first target base transceiver station for determining a second of said positioning data during a first positioning handover between said serving base transceiver station and said first target base transceiver station;
    a second target base transceiver station for determining a third of said positioning data during a second positioning handover between said serving base transceiver station and said second target base transceiver station;
    an originating node for receiving at least said first positioning data from said serving base transceiver station, said originating node sending at least said first positioning data to a mobile switching center;
    at least one target node for receiving at least said second positioning data from said first target base transceiver station; and
    a positioning center for receiving said first positioning data from said mobile switching center, said second positioning data from said target node, and said third positioning data from said second target base transceiver station, said positioning center determining the location of said given mobile terminal based on said first, second, and third positioning data.

2. The telecommunications system of claim 1, wherein said originating node receives said first positioning data from said serving base transceiver station and said third positioning data from said second target base transceiver station, said originating node forwarding said first positioning data and said third positioning data to said positioning center via said first mobile switching center.

3. The telecommunications system of claim 2, wherein said target node forwards said second positioning data to said first mobile switching center, said first mobile switching center transmitting said first, second, and third positioning data to said positioning center.

4. The telecommunications system of claim 1, wherein said target node sends said second positioning data to said originating node via said first mobile switching center, said originating node forwarding said first, second, and third positioning data to said positioning center via said first mobile switching center.

5. The telecommunications system of claim 1, further comprising an additional mobile switching center for receiving said second positioning data from said target node.

6. The telecommunications system of claim 5, wherein said additional mobile switching center forwards said second positioning data to said positioning center.

7. The telecommunications system of claim 5, wherein said additional mobile switching center forwards said second positioning data to said positioning center via said first mobile switching center.

8. The telecommunications system of claim 1, wherein said originating node is a base station controller.

9. The telecommunications system of claim 1, wherein said target node is a base station controller.

10. The telecommunications system of claim 1, wherein said positioning center is located within said first mobile switching center.

11. The telecommunications system of claim 1, wherein said plurality of positioning data consists of Timing Advance values.

12. The telecommunications system of claim 11, wherein said plurality of positioning data further comprises a cause value.

13. The telecommunications system of claim 1, further comprising a positioning application for receiving the location of said given mobile terminal from said positioning center.

14. A method for determining the location of a given one of a plurality of mobile terminals from a plurality of positioning data, said method comprising the steps of:

requesting, by a positioning center, the location of said given mobile terminal;

determining, by a serving base transceiver station in communication with said given mobile terminal, a first one of said plurality of positioning data;

determining, by a first target base transceiver station, a second one of said plurality of positioning data during a first positioning handover between said originating base transceiver station and said first target base transceiver station;

determining, by a second target base transceiver station, a third one of said plurality of positioning data during a second positioning handover between said originating base transceiver station and said second target base transceiver station;

transmitting said first positioning data from said serving base transceiver station to an originating node, said second positioning data being sent to a target node by said first target base transceiver station;

transmitting said first positioning data from said originating node to a positioning center via a first mobile switching center, said second positioning data being transmitted from said target node to said positioning center, said third positioning data being transmitted to said positioning center from said second target base transceiver station; and determining, by said positioning center, the location of said given mobile terminal, using said first, second, and third positioning data.

15. The method of claim 14, wherein said step of determining the location of said given mobile terminal is accomplished using a triangulation algorithm.

16. The method of claim 14, further comprising the step of: after said step of requesting, determining, by said originating node, said first target node to perform said step of determining said second positioning data and said second target node to perform said step of determining said third positioning data.

17. The method of claim 14, wherein said originating node receives said first positioning data from said serving base transceiver station and said third positioning data from said second target base transceiver station, said originating node forwarding said first positioning data and said third positioning data to said positioning center via said first mobile switching center.

18. The method of claim 17, wherein said target node forwards said second positioning data to said first mobile switching center, said mobile switching center transmitting said first, second, and third positioning data to said positioning center.

19. The method of claim 14, wherein said target node sends said second positioning data to said originating node via said first mobile switching center, said originating node forwarding said first, second, and third positioning data to said positioning center via said first mobile switching center.

20. The method of claim 14, wherein said second positioning data is transmitted from said target node to an additional mobile switching center.

21. The method of claim 20, wherein said additional mobile switching center forwards said second positioning data to said positioning center.

22. The method of claim 20, wherein said additional mobile switching center forwards said second positioning data to said positioning center via said first mobile switching center.

23. The method of claim 14, wherein said originating node is a base station controller.

24. The method of claim 14, wherein said target node is a base station controller.

25. The method of claim 14, wherein said positioning center is located within said first mobile switching center.

26. The method of claim 14, wherein said plurality of positioning data consists of Timing Advance values.

27. The method of claim 26, wherein said plurality of positioning data further comprises a cause value.

28. The method of claim 14, further comprising the step of: after said step of determining the location of said given mobile terminal, transmitting the location of said given mobile terminal from said positioning center to a positioning application.

29. The method of claim 14, wherein said originating node is located within said mobile switching center, said target node being located within an additional mobile switching center.

* * * * *